Patented May 2, 1933

1,906,437

UNITED STATES PATENT OFFICE

HARLAN L. TRUMBULL, OF HUDSON, AND HENRY C. HOWARD, OF AKRON, OHIO, ASSIGNORS TO THE B. F. GOODRICH COMPANY, OF NEW YORK, N. Y., A CORPORATION OF NEW YORK

COATING COMPOSITION

No Drawing.   Application filed December 24, 1928.   Serial No. 328,316.

This invention relates to the art of manufacturing paints or similar coating compositions, and has as its object to provide a coating composition which will effectively protect metal or other surfaces from the action of acids or other corrosive materials.

Hard rubber is known to be very resistant to corrosion, and containers and conduits for acids have long been made of hard rubber. However, the mechanical strength of hard rubber is insufficient for many objects or products exposed to corrosive materials, and such objects must be made of a metal and protected from corrosion by means of an impervious coating.

This invention consists in coating surfaces exposed to corrosives with a composition comprising substantial proportions of finely pulverized hard rubber, such as is known to the trade as "hard rubber dust". The hard rubber dust may be employed as a pigment in a linseed oil paint or a varnish, but is preferably mixed with a solution of a tough, highly adherent binder in a volatile solvent therefor. The binder may be chosen from any of a variety of materials. Nitrocellulose or a similar cellulose ester, gelatine, casein, shellac, varnish gums, shellac-like rubber isomers, etc. may be employed. The particular substance chosen depends upon the properties desired in the finished composition. It is dissolved in sufficient solvent to lend it the fluidity necessary for applying the composition, and hard rubber dust is added in such proportions that the coating composition, after drying, consists chiefly of hard rubber, with just sufficient binder to fill the interstices between the particles of hard rubber dust and hold them together. It is sometimes desirable to blend hard rubber dusts of different degrees of fineness in order to secure more advantageously an impervious and compact coating. In some cases it may also be found desirable to blend two or more different binders, or to soften the binder by the addition of a non-volatile solvent, or to add mineral pigments, but this will not usually be found necessary.

The composition is applied to the surface to be coated in any usual manner, such as by dipping, brushing or spraying, and is then allowed to dry at normal or at an elevated temperature. Upon the evaporation of the solvent employed, the binder regains its normal hard solid consistency and binds the hard rubber dust to a closely adherent hard and impermeable coating.

Alternatively, the surfaces to be coated are covered with solutions of any of the above-mentioned binders, or with other adhesive liquids, and hard rubber dust is dusted thereon before it is dry. The coating is then preferably dried and baked. Coatings applied by either one of the above-mentioned processes have proven to be economical, easily applied and permanent, having great resistance to the action of corrosive materials. The coatings have the great advantage over the previously known coatings prepared by the application of a solution of unvulcanized hard rubber which must then be dried and vulcanized at a very high temperature for a long period of time, that they are ordinarily ready for use immediately upon the evaporation of the solvent so that the prolonged heating which is detrimental to so many materials is entirely eliminated. Even where the coating of this invention is heated or baked, it is then ordinarily sufficient to raise the temperature to the desired degree and then immediately to allow it to cool again, for the effect of the heating is merely to modify somewhat the physical condition of the coating, no appreciable chemical changes taking place.

*Example 1.*—As a specific example of one embodiment of this invention, a composition is prepared containing as a binder a heat-plastic rubber isomer resulting from the exothermic reaction of rubber and p-phenol sulphonic acid. The rubber isomer is prepared by mixing 100 parts of rubber with 7.5 parts of p-phenol sulphonic acid, as by mixing on a mill, and then heating the mixture in an oven at 290° F. for 4 hours. During this period the interior of the mass attains a temperature of about 400° F. due to the exothermal reaction of the rubber and the sulphonic acid, the exact temperature depending on the amount of the mixture, its thickness, etc. After cooling the mass it is found to be converted into a hard, tough, heat-plastic balata-like material, soluble in the ordinary rubber solvents, but insoluble in water, alcohol, acetone, etc. It contains carbon and hydrogen in the same ratio as rubber, but is chemically less unsaturated. Such heat-plastic products containing carbon and hydrogen in the same ratio as rubber, but chemically less unsaturated, whether prepared by the above-described method, or by the reaction of rubber with any other isomerizing agent, will hereinafter be generically termed heat-plastic rubber isomers. The rubber isomer prepared as described above, is washed free of acid, dried and dissolved in benzene. 200 parts by weight of fine hard rubber dust is mixed with a quantity of the benzene solution containing 100 parts of a rubber isomer. This composition, when applied to metal surfaces, as by spraying, is found to preserve them from corrosion much longer than ordinary paint films.

*Example 2.*—A nitrocellulose laquer is prepared in the customary manner by dissolving a low viscosity nitrocellulose in a mixture of esters and/or higher alcohols. 150 parts by weight of hard rubber dust are mixed with a quantity of the lacquer containing 100 parts of dry solids. This composition when applied to wood or metal surfaces forms a tough, elastic, corrosion-resistant coating.

*Example 3.*—A solution of a heat-plastic rubber isomer, such as that mentioned in Example 1, is applied to a surface which is to be protected. When the coating has partially dried to a tacky condition, it is heavily dusted with hard rubber dust. After drying, the coating is baked at a temperature approaching the softening temperature of the rubber isomer, say at about 250° F. The coating is found to be very resistant to acids and other corrosive materials.

It is to be understood that the examples above are merely illustrative, and that numerous modifications may be introduced without departing from the spirit and scope of this invention. For example, the binder, instead of being dissolved, may be finely dispersed or suspended in a volatile liquid in which it is insoluble, the hard rubber dust stirred into the liquid, and such dispersion or suspension applied to the surfaces to be coated. If necessary, the coating may then be baked to promote the union of the binder and the particles of hard rubber dust into a uniform coherent film.

While we have herein disclosed with considerable particularity certain preferred manners of performing our invention, we do not thereby desire or intend to limit ourselves solely thereto, for, as hitherto stated, the precise proportions of the materials utilized may be varied and other materials having equivalent properties may be employed if desired without departing from the spirit and scope of the invention as defined in the appended claims.

We claim:

1. A coating composition comprising 100 to 300 parts by weight of hard rubber dust and a solution of 100 parts of a heat-plastic rubber isomer in a neutral volatile solvent therefor.

2. A coating composition comprising 100 to 300 parts by weight of hard rubber dust and a solution of 100 parts of a heat-plastic rubber isomer in benzene.

3. A coating composition comprising approximately 200 parts by weight of hard rubber dust and a solution of 100 parts of a heat-plastic rubber isomer in benzene.

4. The method of protecting surfaces from corrosion which comprises applying thereto a mixture of 100 to 300 parts of hard rubber dust with a solution of 100 parts of a heat-plastic rubber isomer.

5. The method of protecting surfaces from corrosion which comprises applying thereto a mixture of 100 to 300 parts of hard rubber dust and a solution of 100 parts of a heat-plastic rubber isomer in benzene, drying the coating and baking it.

In witness whereof we have hereunto set our hands this 17th day of December, 1928.

HARLAN L. TRUMBULL.
HENRY C. HOWARD.